(12) United States Patent
Powlen et al.

(10) Patent No.: US 10,015,231 B2
(45) Date of Patent: Jul. 3, 2018

(54) ESTABLISHING SELECT ROUTING OF PROPRIETARY DIGITAL CONTENT

(71) Applicant: FMR LLC, Boston, MA (US)

(72) Inventors: Robert Powlen, Boston, MA (US); Michael Hejl, Boston, MA (US); Ray Costello, Boston, MA (US)

(73) Assignee: FMR LLC, Boston, MA (US)

( * ) Notice: Subject to any disclaimer, the term of this patent is extended or adjusted under 35 U.S.C. 154(b) by 301 days.

(21) Appl. No.: 15/067,809

(22) Filed: Mar. 11, 2016

(65) Prior Publication Data

US 2016/0269470 A1    Sep. 15, 2016

Related U.S. Application Data

(60) Provisional application No. 62/131,798, filed on Mar. 11, 2015.

(51) Int. Cl.
  *G06F 15/16* (2006.01)
  *H04L 29/08* (2006.01)
  *G06Q 10/00* (2012.01)

(52) U.S. Cl.
  CPC ............ *H04L 67/06* (2013.01); *G06Q 10/00* (2013.01); *H04L 2209/60* (2013.01)

(58) Field of Classification Search
  CPC ................. H04L 67/06; H04L 2209/60; H04L 2209/603; G06Q 10/00
  See application file for complete search history.

(56) References Cited

U.S. PATENT DOCUMENTS

| 6,983,371 | B1* | 1/2006 | Hurtado | G06F 21/10 |
| | | | | 380/255 |
| 7,124,302 | B2* | 10/2006 | Ginter | G06F 21/10 |
| | | | | 713/189 |
| 7,586,929 | B2* | 9/2009 | Mizutani | H04L 45/00 |
| | | | | 370/389 |
| 7,962,750 | B1* | 6/2011 | Gruse | G06F 21/10 |
| | | | | 705/53 |
| 2011/0116376 | A1* | 5/2011 | Pacella | G06F 11/1076 |
| | | | | 370/235 |

(Continued)

*Primary Examiner* — Krisna Lim
(74) *Attorney, Agent, or Firm* — Proskauer Rose LLP

(57) ABSTRACT

Methods and apparatuses, including computer program products, are described for establishing select routing of proprietary digital content. A server computing device prepares a package of digital content, where the digital content includes proprietary content and non-proprietary content. The server segregates the package of digital content into proprietary content and non-proprietary content, and assigns a content identifier to each item of proprietary content. The server transmits the proprietary content to a computing device of a digital content management service. The server receives a notification of acceptance of the proprietary content from the computing device of the digital content management service and a notification of acceptance of the non-proprietary content from a second remote computing device. The server presents an accepted package of digital content on the first remote computing device, where the accepted package comprises accepted proprietary content and accepted non-proprietary content.

21 Claims, 2 Drawing Sheets

(56) References Cited

U.S. PATENT DOCUMENTS

2014/0371891 A1* 12/2014 Moorer ............... H04L 65/4015
700/94
2015/0131444 A1* 5/2015 Malatack .............. H04L 47/125
370/235
2017/0041296 A1* 2/2017 Ford ................... H04L 63/0421

* cited by examiner

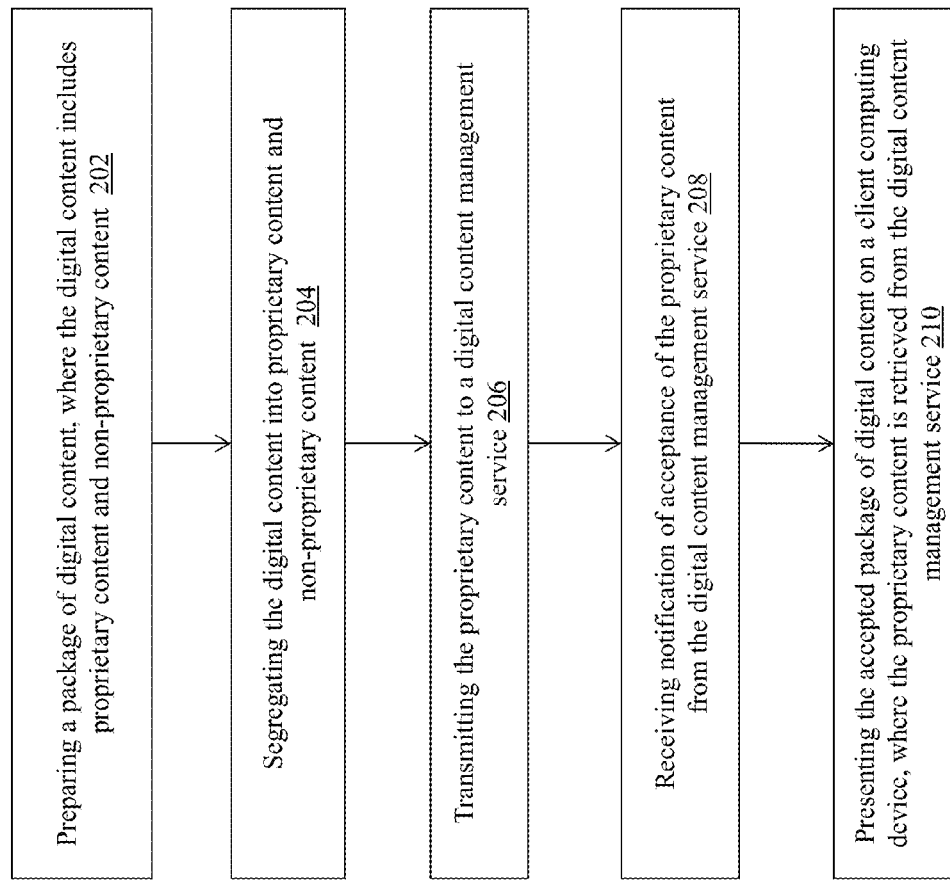

ESTABLISHING SELECT ROUTING OF PROPRIETARY DIGITAL CONTENT

RELATED APPLICATIONS

This application claims priority to U.S. Provisional Patent Application No. 62/131,798, filed on Mar. 11, 2015, the entirety of which is incorporated herein by reference.

TECHNICAL FIELD

This application relates generally to methods and apparatuses, including computer program products, for establishing select routing of proprietary digital content.

BACKGROUND

For customers, opening an investment account with a financial institution using an intermediary investment advisor has typically been a paper-based process. For example, the advisor must manually complete the financial institution account paperwork and his own customer agreement paperwork, sign, and mail the completed paperwork to the customer. The customer then reviews the paperwork, completes the necessary forms, and returns the packet of documents to the advisor. This process is often susceptible to errors due to manual completion of the forms, and to time delays in preparing, mailing, and receiving the paper forms.

Recently, certain financial institutions have begun enabling advisors to provide account opening documents to customers using an electronic approach. For example, the advisor can prepare digital versions of the financial institution account paperwork using, e.g., a web portal provided by the financial institution, and electronically deliver the paperwork to the customer for review (e.g., email, web portal access). However, due to regulatory and privacy constraints, financial institutions typically do not allow advisors to provide their own customer agreement forms electronically to customers using the same electronic mechanism as the financial institution documents. For example, the financial institution may not be able to store any sensitive information in the advisor agreement documents due to regulatory compliance concerns.

As a result, the account opening process is bifurcated—meaning that the advisor will electronically prepare and sign the financial institution account paperwork for delivery to the customer electronically, but still prepare his own agreement paperwork on paper and mail it to the customer. This process is similarly susceptible to errors and delay as described above, and also leads to advisors being less inclined to offer products from a financial institution that only supports the bifurcated model.

SUMMARY

Therefore, what is needed are methods and systems to enable electronic preparation, delivery, and acceptance of proprietary and non-proprietary digital content in a unified package—while managing the respective sets of digital content according to compliance, privacy, encryption, and security requirements of the respective entities that provide the digital content.

The technology, in one aspect, features a method for establishing select routing of proprietary digital content. A server computing device prepares a package of digital content, where the digital content includes proprietary content received from a first remote computing device and non-proprietary content retrieved from a database. The server computing device segregates the package of digital content into proprietary content and non-proprietary content. The server computing device assigns a content identifier to each item of proprietary content. The server computing device transmits the proprietary content to a computing device of a digital content management service for acceptance of the proprietary content by a second remote computing device. The server computing device receives a notification of acceptance of the proprietary content from the computing device of the digital content management service. The server computing device receives a notification of acceptance of the non-proprietary content from the second remote computing device. The server computing device presents an accepted package of digital content on the first remote computing device, wherein the accepted package of digital content comprises accepted proprietary content and accepted non-proprietary content and the accepted proprietary content is retrieved from the computing device of the digital content management service.

The invention, in another aspect, features a system for establishing select routing of proprietary digital content. The system includes a server computing device configured to prepare a package of digital content, where the digital content includes proprietary content received from a first remote computing device and non-proprietary content retrieved from a database. The server computing device is configured to segregate the package of digital content into proprietary content and non-proprietary content. The server computing device is configured to assign a content identifier to each item of proprietary content. The server computing device is configured to transmit the proprietary content to a computing device of a digital content management service for acceptance of the proprietary content by a second remote computing device. The server computing device is configured to receive a notification of acceptance of the proprietary content from the computing device of the digital content management service. The server computing device is configured to receive notification of acceptance of the non-proprietary content from the second remote computing device. The server computing device is configured to present an accepted package of digital content on the first remote computing device, wherein the accepted package of digital content comprises accepted proprietary content and accepted non-proprietary content and the accepted proprietary content is retrieved from the computing device of the digital content management service.

The invention, in another aspect, features a computer program product, tangibly embodied in a non-transitory computer readable storage device, for establishing select routing of proprietary digital content. The computer program product includes instructions operable to cause a server computing device to prepare a package of digital content, where the digital content includes proprietary content received from a first remote computing device and non-proprietary content retrieved from a database. The computer program product includes instructions operable to cause the server computing device to segregate the package of digital content into proprietary content and non-proprietary content. The computer program product includes instructions operable to cause the server computing device to assign a content identifier to each item of proprietary content. The computer program product includes instructions operable to cause the server computing device to transmit the proprietary content to a computing device of a digital content management service for acceptance of the proprietary content by a second remote computing device.

The computer program product includes instructions operable to cause the server computing device to receive a notification of acceptance of the proprietary content from the computing device of the digital content management service. The computer program product includes instructions operable to cause the server computing device to receive a notification of acceptance of the non-proprietary content from the second remote computing device. The computer program product includes instructions operable to cause the server computing device to present an accepted package of digital content on the first remote computing device, wherein the accepted package of digital content comprises accepted proprietary content and accepted non-proprietary content and the accepted proprietary content is retrieved from the computing device of the digital content management service.

Any of the above aspects can include one or more of the following features. In some embodiments, segregating the package of digital content comprises separating the package of digital content into portions, wherein a first portion comprises the proprietary content and a second portion comprises the non-proprietary content, and suppressing data validation and data storage processes normally executable by the server computing device from executing on the proprietary content. In some embodiments, assigning a content identifier to each item of proprietary content comprises updating metadata associated with each item of proprietary content to include the content identifier.

In some embodiments, the computing device of the digital content management service is configured to transmit the proprietary content to the second remote computing device, receive a first indication of acceptance of the proprietary content from the second remote computing device, validate the first indication of acceptance, and transmit the first notification of acceptance of the proprietary content to the server computing device. In some embodiments, the indication of acceptance of the proprietary content comprises an e-signature certificate applied to the proprietary content by the second remote computing device. In some embodiments, the first remote computing device is further configured to update the accepted package of digital content to apply a second indication of acceptance to the accepted proprietary content of the accepted package of digital content, and transmit the updated package of digital content to the server computing device.

In some embodiments, the proprietary content is encrypted by the server computing device before the proprietary content is transmitted to the digital content management service. In some embodiments, the digital content comprises software application code files. In some embodiments, the digital content comprises digital media files. In some embodiments, the digital content comprises text files.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 is a flow diagram of a method for establishing select routing of proprietary digital content.

DETAILED DESCRIPTION

Figure 1:
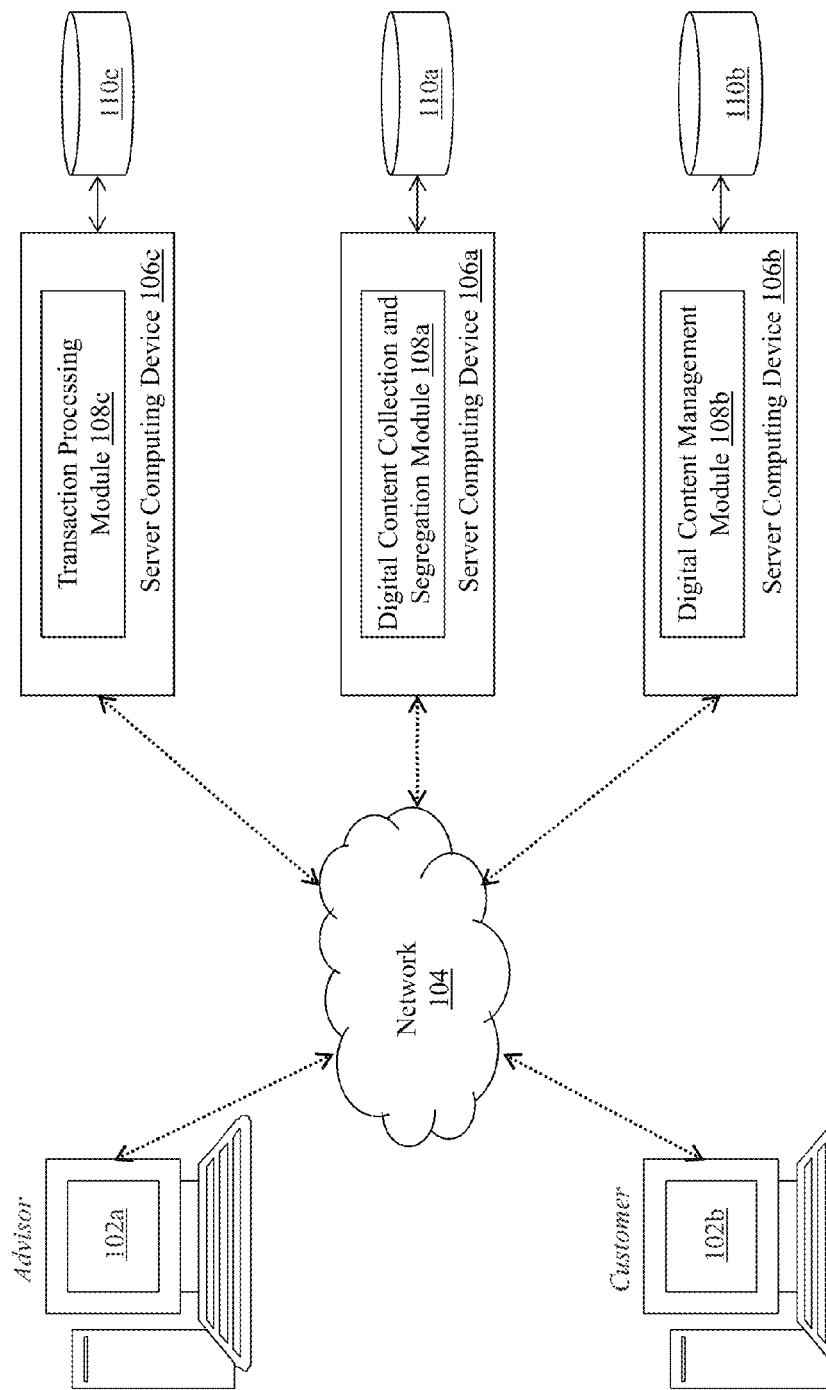
FIG. 1 is a block diagram of a system for establishing select routing of proprietary digital content.

FIG. 1 is a block diagram of a system 100 for establishing select routing of proprietary digital content. The system 100 includes a plurality of client computing devices 102a-102b, a communications network 104, server computing devices 106a-106c that respectively include a digital content collection and segregation module 108a, a digital content management module 108b, a transaction processing module 108c, and are respectively coupled to databases 110a-110c.

The plurality of client computing devices 102a-102b connect to the server computing devices 106a-106c via the communications network 104. For example, client device 102a is associated with an investment advisor and client device 102b is associated with a customer of the investment advisor. Exemplary computing devices include desktop computers, laptop computers, tablets, mobile devices, smartphones, and internet appliances. It should be appreciated that other types of computing devices that are capable of connecting to the server computing devices 106a-106c can be used without departing from the scope of the methods and systems described herein. And, although FIG. 1 depicts two client computing devices 102a-102b and three server computing devices 106a-106c, it should be appreciated that the system 100 can include any number of computing devices.

The communication network 104 enables the client computing devices 102a-102b to communicate with the server computing devices 106a-106c in order to prepare, accept, sign, and manage digital content. The network 104 can be a local network, such as a LAN, or a wide area network, such as the Internet and/or a cellular network. In some embodiments, the network 104 is comprised of several discrete networks and/or sub-networks (e.g., cellular Internet) that enable the client computing devices 102a-102b to communicate with the server computing devices 106a-106c.

The server computing devices 106a-106c are a combination of hardware and software modules that enable the plurality of client computing devices 102a-102b to prepare, accept, sign, and manage digital content. The server computing device 106a includes a digital content collection and segregation module 108a, the functionality of which will be explained in greater detail below. The server computing device 106b includes a digital content management module 108b, the functionality of which will be explained in greater detail below. The server computing device 106c includes a transaction processing module 108c, the functionality of which will be explained in greater detail below.

The modules 108a-108c are specialized hardware and/or software modules that execute on a processor and interact with memory modules of the respective server computing devices 106a-106c as shown in FIG. 1 to perform functions associated with preparing, accepting, signing, and managing digital content as described herein. In some embodiments, the functionality of each of the modules 108a-108c is distributed among several computing devices. It should be appreciated that any number of computing devices, arranged in a variety of architectures, resources, and configurations (e.g., cluster computing, virtual computing, cloud computing) can be used without departing from the scope of the methods and systems described herein.

The system 100 also includes databases 110a-110c. Each database 110a-110c is coupled to a corresponding server computing device 106a-106c, and each database 110a-110c stores data used by the corresponding server computing device 106a-106c and the modules 108a-108c to perform the functionality associated with preparing, accepting, signing, and managing digital content. In some embodiments, the databases 110a-110c can be integrated with the corresponding server computing device 106a-106c or be located on a separate computing device.

FIG. 2 is a flow diagram of a method 200 for establishing select routing of proprietary digital content, using the system 100 of FIG. 1. A user (e.g., an advisor) at client computing device 102a prepares (202) a package of digital content. For example, a customer may have instructed the advisor to open an investment account for the customer with a particular financial institution (e.g., Fidelity Investments). The advisor can use client computing device 102a to connect to a web portal at server computing device 106a that is provided by the financial institution to prepare electronic versions (e.g., PDFs) of the account opening forms as required by the financial institution.

As part of this process, the advisor may require the customer to simultaneously execute a proprietary advisor agreement that establishes the legal and business relationship between the advisor and the customer, and provide authority for the advisor to open the account. The proprietary advisor agreement is specific to the individual investment advisor, and is not governed by the financial institution. The advisor can use client computing device 102a can prepare an electronic version of the proprietary advisor agreement and upload the advisor agreement to the financial institution web portal at server computing device 106a, thereby creating a package of digital content associated with establishing the investment account that includes both content proprietary to the advisor (i.e., the agreement) and content that is not proprietary to the advisor (i.e., the financial institution account opening forms).

However, many financial institutions have restrictions and limitations on the extent to which they can receive and store proprietary content that contains sensitive personal, legal, and/or financial information. For example, either through regulatory compliance requirements or self-imposed compliance requirements, financial institutions may not be able to receive or store such proprietary information in any substantive or permanent way. As a result, the system 100 provides a mechanism whereby the proprietary content can be managed and delivered to the necessary parties to the transaction electronically and seamlessly without compromising the compliance requirements of the financial institution.

The digital content collection and segregation module 108a of server computing device 106a segregates (204) the package of digital content into proprietary content (e.g., uploaded by the advisor) and non-proprietary content (e.g., provided by the financial institution). The module 108a assigns a unique content identifier (e.g., ID number) to each piece of proprietary digital content, but also suppresses any substantive data validation and data storage processes that would normally execute on digital content uploaded by an advisor. For example, the module 108a can generate a unique ID number for each item of proprietary digital content and associate the ID number with the specific item (e.g., store the ID number in a local database, embed the ID number into the item of digital content or metadata associated with the item). But, the module 108a does not store the item of digital content (or potentially sensitive data contained in the item of digital content) in a permanent data repository used by the financial institution and subject to compliance requirements. In some embodiments, the module 108a stores the digital content in a temporary database (e.g., database 110a) that is used to handle the intake of the digital content from the advisor's computing device 102a, assignment of the content identifier, and transmission of the digital content to a digital content management service.

The digital content collection and segregation module 108a transmits (206) the proprietary digital content, now assigned a content identifier, to a digital content management service that is separate from the financial institution that manages the investment account. The digital content management service can be considered 'neutral' for the purposes of the methods and systems described herein, in that it is not subject to the same regulatory and/or self-imposed compliance requirements as the financial institution.

For example, the module 108a transmits the proprietary digital content to digital content management module 108b of server computing device 106b. The digital content management module 108b stores the proprietary digital content (e.g., in database 110b) and manages the proprietary digital content through the account opening process. The digital content management module 108b generates a package of digital content, containing at least the proprietary digital content and in some cases, both the proprietary and non-proprietary digital content, and transmits the package of digital content to the client computing device 102b associated with the customer. For example, the customer can receive a notification that his investment account documents are ready for review and acceptance. The customer can use client computing device 102b to access a web portal associated with the digital content management service (e.g., on server computing device 106b), access both the proprietary and non-proprietary documents, and electronically sign the documents to indicate acceptance of the documents.

Also, it should be noted that in some embodiments, the non-proprietary digital content (i.e., the account documents provided by the financial institution) can be transmitted to the digital content management module 108b for storage. In other embodiments, the non-proprietary digital content can be stored in a database that is under control of the financial institution, and the digital content management module 108b can retrieve the non-proprietary digital content from the financial institution database.

Once the customer has accepted the digital content (e.g., by electronically signing the documents), the digital content management module 108b transmits a notification of acceptance of the proprietary content to be received (208) by the digital content collection and segregation module 108a on server computing device 106a. In some embodiments, the digital content management module 108b also transmits a notification of acceptance of the proprietary content to the client computing device 102a associated with the advisor—so that the advisor can retrieve the completed proprietary content from the digital content management service.

The digital content collection and segregation module 108a determines that both the proprietary digital content and the non-proprietary digital content have been accepted by the customer via client computing device 102b, and generates an accepted package of digital content for presentation on a client computing device. The accepted package of digital content includes the non-proprietary content as stored in a database associated with the financial institution and links to the proprietary content as stored in the digital content management service. The module 108a presents (210) the accepted package of digital content on the client computing device 102a of the advisor, where the advisor can review the non-proprietary digital content directly and activate the links to the proprietary digital content for retrieval from the digital content management service.

In conjunction with the presentation of the accepted package of digital content, the module 108a transmits the accepted non-proprietary content to a transaction processing module 108c of server computing device 106c that is operated by the financial institution. The transaction processing module 108c validates the accepted non-proprietary content, stores the non-proprietary content in database 110c and performs processing based upon the non-proprietary content to complete the investment account acceptance process and perform other workflow processing to establish the investment account (e.g., create a customer record, assign an account number, and so forth).

It should be appreciated that although the above embodiments relate to the packaging and routing of proprietary digital content that relates to opening of an investment account (e.g., computerized text documents), the techniques are equally applicable to a variety of other contexts—such as packaging and routing of digital media content (e.g., digital images, music or video files), software development content (e.g., source code files, executables), security files (e.g., encryption keys, certificates) and other types of digital content.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more special-purpose processors executing a computer program to perform functions of the methods and systems described herein by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOW), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention described herein may be embodied in other specific forms without departing from the spirit or essential characteristics thereof. The foregoing embodiments are therefore to be considered in all respects illustrative rather than limiting of the invention described herein.

What is claimed is:

1. A method for establishing select routing of proprietary digital content, the method comprising:
   preparing, by a server computing device, a package of digital content, wherein the digital content includes proprietary content received from a first remote computing device and non-proprietary content retrieved from a database;
   segregating, by the server computing device, the package of digital content into proprietary content and non-proprietary content;
   assigning, by the server computing device, a content identifier to each item of proprietary content;
   transmitting, by the server computing device, the proprietary content to a computing device of a digital content management service for acceptance of the proprietary content by a second remote computing device;
   receiving, by the server computing device, a notification of acceptance of the proprietary content from the computing device of the digital content management service;
   receiving, by the server computing device, a notification of acceptance of the non-proprietary content from the second remote computing device; and
   presenting, by the server computing device, an accepted package of digital content on the first remote computing device, wherein the accepted package of digital content comprises accepted proprietary content and accepted non-proprietary content and the accepted proprietary content is retrieved from the computing device of the digital content management service.

2. The method of claim 1, wherein the step of segregating the package of digital content comprises
   separating, by the server computing device, the package of digital content into portions, wherein a first portion comprises the proprietary content and a second portion comprises the non-proprietary content; and
   suppressing, by the server computing device, data validation and data storage processes normally executable by the server computing device from executing on the proprietary content.

3. The method of claim 1, wherein the step of assigning a content identifier to each item of proprietary content comprises updating, by the server computing device, metadata associated with each item of proprietary content to include the content identifier.

4. The method of claim 1, further comprising
   transmitting, by the computing device of the digital content management service, the proprietary content to the second remote computing device;
   receiving, by the computing device of the digital content management service, a first indication of acceptance of the proprietary content from the second remote computing device;
   validating, by the computing device of the digital content management service, the first indication of acceptance; and
   transmitting, by the computing device of the digital content management service, the first notification of acceptance of the proprietary content to the server computing device.

5. The method of claim 4, wherein the indication of acceptance of the proprietary content comprises an e-signature certificate applied to the proprietary content by the second remote computing device.

6. The method of claim 4, further comprising
   updating, by the first remote computing device, the accepted package of digital content to apply a second indication of acceptance to the accepted proprietary content of the accepted package of digital content; and
   transmitting, by the first remote computing device, the updated package of digital content to the server computing device.

7. The method of claim 1, wherein the proprietary content is encrypted by the server computing device before the proprietary content is transmitted to the digital content management service.

8. The method of claim 1, wherein the digital content comprises software application code files.

9. The method of claim 1, wherein the digital content comprises digital media files.

10. The method of claim 1, wherein the digital content comprises text files.

11. A system for establishing select routing of proprietary digital content, the system comprising a server computing device configured to
    prepare a package of digital content, wherein the digital content includes proprietary content received from a first remote computing device and non-proprietary content retrieved from a database;
    segregate the package of digital content into proprietary content and non-proprietary content;
    assign a content identifier to each item of proprietary content;
    transmit the proprietary content to a computing device of a digital content management service for acceptance of the proprietary content by a second remote computing device;

receive a notification of acceptance of the proprietary content from the computing device of the digital content management service;
receive a notification of acceptance of the non-proprietary content from the second remote computing device; and
present an accepted package of digital content on the first remote computing device, wherein the accepted package of digital content comprises accepted proprietary content and accepted non-proprietary content and the accepted proprietary content is retrieved from the computing device of the digital content management service.

12. The system of claim 11, wherein segregating the package of digital content comprises
separating the package of digital content into portions, wherein a first portion comprises the proprietary content and a second portion comprises the non-proprietary content; and
suppressing data validation and data storage processes normally executable by the server computing device from executing on the proprietary content.

13. The system of claim 11, wherein assigning a content identifier to each item of proprietary content comprises updating metadata associated with each item of proprietary content to include the content identifier.

14. The system of claim 11, wherein the computing device of the digital content management service is configured to
transmit the proprietary content to the second remote computing device;
receive a first indication of acceptance of the proprietary content from the second remote computing device;
validate the first indication of acceptance; and
transmit the first notification of acceptance of the proprietary content to the server computing device.

15. The system of claim 14, wherein the indication of acceptance of the proprietary content comprises an e-signature certificate applied to the proprietary content by the second remote computing device.

16. The system of claim 14, wherein the first remote computing device is further configured to
update the accepted package of digital content to apply a second indication of acceptance to the accepted proprietary content of the accepted package of digital content; and
transmit the updated package of digital content to the server computing device.

17. The system of claim 11, wherein the proprietary content is encrypted by the server computing device before the proprietary content is transmitted to the digital content management service.

18. The system of claim 11, wherein the digital content comprises software application code files.

19. The system of claim 11, wherein the digital content comprises digital media files.

20. The system of claim 11, wherein the digital content comprises text files.

21. A computer program product, tangibly embodied in a non-transitory computer readable storage device, for establishing select routing of proprietary digital content, the computer program product including instructions operable to cause a server computing device to
prepare a package of digital content, wherein the digital content includes proprietary content received from a first remote computing device and non-proprietary content retrieved from a database;
segregate the package of digital content into proprietary content and non-proprietary content;
assign a content identifier to each item of proprietary content;
transmit the proprietary content to a computing device of a digital content management service for acceptance of the proprietary content by a second remote computing device;
receive a notification of acceptance of the proprietary content from the computing device of the digital content management service;
receive a notification of acceptance of the non-proprietary content from the second remote computing device; and
present an accepted package of digital content on the first remote computing device, wherein the accepted package of digital content comprises accepted proprietary content and accepted non-proprietary content and the accepted proprietary content is retrieved from the computing device of the digital content management service.

* * * * *